June 2, 1953  R. MÖLLER  2,640,688
MIXING AND KNEADING MACHINE
Filed Jan. 14, 1952
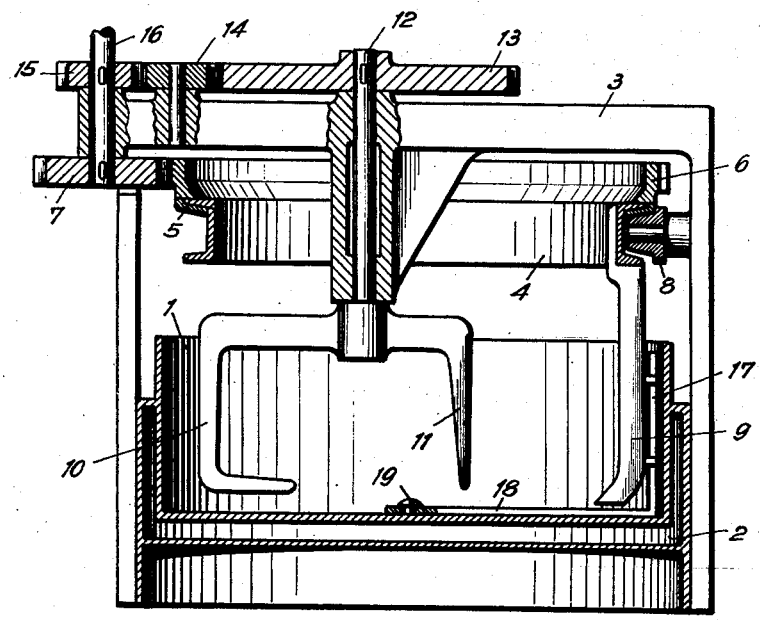
INVENTOR
Reinhold Möller
BY Bryant & Lowry
ATTORNEYS.

Patented June 2, 1953

2,640,688

UNITED STATES PATENT OFFICE 2,640,688

MIXING AND KNEADING MACHINE

Reinhold Möller, Herford, Germany

Application January 14, 1952, Serial No. 266,278
In Germany January 20, 1951

9 Claims. (Cl. 259—104)

My invention relates to improvements in mixing and kneading machines in which by special arrangement of vertical and horizontal working members an intimate mixing, kneading and stirring is ensured.

Prior art mixing and kneading machines are impaired by disadvantageous relative motions of the mass inasmuch as mass adhering to the working members of the machine is partly spread by the latter so that said parts of mass are left unmixed and without use for the working operation.

It is an object of the present invention to provide an improved mixing and kneading machine in which said disadvantages are avoided.

In the mixing and kneading machine according to the present invention the mixing, stirring, kneading and agitating vaned elements are designed and arranged so as to avoid any dead space and enabling such a co-operation of said members that the mass parts will be squeezed off due to mutual and reciprocal action of said members, thus avoiding any adhesion of unmixed mass parts. Even any facing of bearings through the mass are omitted. All working members employed are guided into the container as well as driven from the top side. The working members encounter each other due to their opposite directions of their motions, thereby mixing, compressing, cutting, continuously loosening, and propelling the mass across the container thus ensuring an intimate mixing and kneading of the whole mass. The stirring and agitating vaned members, which are centrally mounted in the container, are moved by means of a fastening ring disposed at the container. A stirring element eccentrically moving extends through said fastening ring.

The stirring member provided with both a long and a short arm is eccentrically mounted so as to enable said arms to pass through the whole center area of the container.

The accompanying drawing shows a cross sectional view of the mixing and kneading machine according to the invention.

A container 1 is provided with a water jacket 2. A stirring and agitating vaned member 9 is secured to a fastening ring 4 which is connected to a toothed rim 6. Besides, a wall stripper 17 and a bottom stripper 18 are secured to the member 9. The bottom stripper is rotatably supported about a point 19. The machine is driven by a driving shaft 16 through a wheel 7. The fastening ring is supported by several bearing rolls 8 and, for this purpose, provided with a tread 5. A vertical shaft 12 is pivoted in a bearing bridge 3 so as to be disposed somewhat eccentrically with respect to the container. Stirring members 10 and 11 are fixed on said vertical shaft 12 which is driven by wheels 15, 14, 13.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a mixing and kneading machine, a frame, a container supported by the frame, a ring rotatably mounted on the frame above and concentric with the container, a stirring and agitating vaned member depending from the ring into the container adjacent the side wall of the latter, a vertical shaft journaled in the frame eccentrically of the container, a stirring member fixed on the lower end of said shaft extending into the container and means for rotating said ring and shaft.

2. A mixing and kneading machine as in claim 1, wherein said means includes a power shaft, a gear train interposed between the power shaft and the ring and a second gear train interposed between the power shaft and the eccentrically mounted vertical shaft.

3. A mixing and kneading machine as in claim 1, wherein said means includes a power shaft, a gear train interposed between the power shaft and the ring and a second gear train interposed between the power shaft and the eccentrically mounted vertical shaft and including a reversing gear whereby the stirring members carried by the vertical shaft and ring are rotated in reverse directions.

4. A mixing and kneading machine as in claim 1, wherein a combined side wall and bottom stripper is carried by the agitating means depending from said ring.

5. A mixing and kneading machine as in claim 1, wherein said means includes a power shaft, a gear train interposed between the power shaft and the ring and a second gear train interposed between the power shaft and the eccentrically mounted vertical shaft, and a combined side wall and bottom stripper carried by the agitating means depending from said ring.

6. A mixing and kneading machine as in claim 1, wherein said means includes a power shaft, a gear train interposed between the power shaft and the ring and a second gear train interposed between the power shaft and the eccentrically mounted vertical shaft and including a reversing gear whereby the stirring members carried by the vertical shaft and ring are rotated in reverse directions and a combined side wall and bottom stripper carried by the agitating means depending from said ring.

7. A mixing and kneading machine as in claim 1, wherein a combined side wall and bottom stripper is carried by the agitating means depending from said ring, said combined stripper being of substantially L formation with the vertical leg thereof moving in proximity of the side wall of the container, the horizontal leg of the stripper moving in proximity of the bottom wall of the container and the free end of the horizontal leg of the stripper having a pivotal connection with the bottom wall of the container centrally thereof.

8. A mixing and kneading machine as in claim 1, wherein said means includes a power shaft, a gear train interposed between the power shaft and the ring and a second gear train interposed between the power shaft and the eccentrically mounted vertical shaft, and a combined side wall and bottom stripper carried by the agitating means depending from said ring, said combined stripper being of substantially L formation with the vertical leg thereof moving in proximity of the side wall of the container, the horizontal leg of the stripper moving in proximity of the bottom wall of the container and the free end of the horizontal leg of the stripper having a pivotal connection with the bottom wall of the container centrally thereof.

9. A mixing and kneading machine as in claim 1, wherein said means includes a power shaft, a gear train interposed between the power shaft and the ring and a second gear train interposed between the power shaft and the eccentrically mounted vertical shaft and including a reversing gear whereby the stirring members carried by the vertical shaft and ring are rotated in reverse directions and a combined side wall and bottom stripper carried by the agitating means depending from said ring, said combined stripper being of substantially L formation with the vertical leg thereof moving in proximity of the side wall of the container, the horizontal leg of the stripper moving in proximity of the bottom wall of the container and the free end of the horizontal leg of the stripper having a pivotal connection with the bottom wall of the container centrally thereof.

REINHOLD MÖLLER.

References Cited in the file of this patent

UNITED STATES PATENTS

| Number | Name | Date |
| --- | --- | --- |
| 628,337 | Kryszewski | July 4, 1899 |
| 644,649 | Walter | Mar. 6, 1900 |
| 1,475,638 | Low | Nov. 27, 1923 |
| 2,481,731 | Dubin | Sept. 13, 1949 |